US012667975B2

(12) United States Patent
Morin et al.

(10) Patent No.: US 12,667,975 B2
(45) Date of Patent: Jun. 30, 2026

(54) ROBOTIC POLISHING SYSTEM AND METHOD FOR USING SAME

(71) Applicant: Pratt & Whitney Canada Corp., Longueuil (CA)

(72) Inventors: Philippe Morin, Beloeil (CA); Guillaume Whittom, Longueuil (CA); Canam Hoang, Longueuil (CA); Jean-Francois Collette, Montreal (CA); Pierre-Luc Nault, Sainte-Julie (CA); Thomas Roux, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 237 days.

(21) Appl. No.: 18/397,907

(22) Filed: Dec. 27, 2023

(65) Prior Publication Data

US 2024/0208071 A1     Jun. 27, 2024

Related U.S. Application Data

(60) Provisional application No. 63/435,486, filed on Dec. 27, 2022.

(51) Int. Cl.
B25J 11/00 (2006.01)
B24B 19/14 (2006.01)
(Continued)

(52) U.S. Cl.
CPC ........... B25J 11/0065 (2013.01); B25J 9/161 (2013.01); B25J 9/1697 (2013.01); B25J 15/0019 (2013.01); B25J 19/023 (2013.01)

(58) Field of Classification Search
CPC ...... B25J 11/0065; B25J 9/161; B25J 9/1697; B25J 15/0019; B25J 19/023; B24B 19/14;
(Continued)

(56) References Cited

U.S. PATENT DOCUMENTS 8,135,208 B1 *  3/2012  Vangal-Ramamurthy ...................
                                              G06T 7/80
                                              700/254
11,333,572 B2   5/2022  Lhommeau
                        (Continued)

FOREIGN PATENT DOCUMENTS

CN      205588102 U  *  9/2016
CN      109483539 A     3/2019
                (Continued)

OTHER PUBLICATIONS

Xu Xiaohu et al: "TCP-based calibration in robot-assisted belt grinding of aero-engine blades using scanner measurements", The International Journal of Advanced Manufacturing Technology, vol. 90, No. 1, Sep. 5, 2016, pp. 635-647.
(Continued)

*Primary Examiner* — Harry Y Oh

(74) *Attorney, Agent, or Firm* — Getz Balich LLC

(57)     ABSTRACT

A polishing system includes an end effector, a calibration system, and a controller. The end effector includes a polishing arm, a motor, and a tool head. The tool head extends along a lengthwise axis between and to an inner end and a tip end. The tool head includes a belt tensioner and a roller. The roller is rotatable about a tool center point of the tool head at the tip end. The tool head is configured to retain an abrasive belt extending between the motor and the roller. The calibration system includes an imaging device. The controller includes a processor in communication with a non-transitory memory storing instructions, which instructions when executed by the processor, cause the processor to control the imaging device to acquire image data for the tool head, identify a position of the tool center point using the image data, and store the identified position in the memory.

18 Claims, 6 Drawing Sheets

(51) Int. Cl.

| | |
|---|---|
| *B24B 19/26* | (2006.01) |
| *B24B 27/00* | (2006.01) |
| *B24B 49/10* | (2006.01) |
| *B24B 49/12* | (2006.01) |
| *B24B 51/00* | (2006.01) |
| *B25J 9/16* | (2006.01) |
| *B25J 15/00* | (2006.01) |
| *B25J 19/02* | (2006.01) |

(58) Field of Classification Search
CPC ... B24B 19/26; B24B 21/165; B24B 27/0038; B24B 49/10; B24B 49/12; B24B 51/00
See application file for complete search history.

(56) References Cited

U.S. PATENT DOCUMENTS

| | | | | |
|---|---|---|---|---|
| 11,338,440 | B2 | 5/2022 | Suzuki | |
| 2010/0248591 | A1* | 9/2010 | Marconi | B24B 49/12 |
| | | | | 451/6 |

| | | | | |
|---|---|---|---|---|
| 2011/0190790 | A1* | 8/2011 | Summerer | A61B 34/76 |
| | | | | 606/130 |
| 2018/0345443 | A1* | 12/2018 | Ho | B24B 23/06 |
| 2020/0070349 | A1* | 3/2020 | Yoshida | B25J 9/1612 |
| 2020/0198145 | A1 | 6/2020 | Hsu | |
| 2021/0001423 | A1 | 1/2021 | Boillot | |
| 2021/0308825 | A1* | 10/2021 | Gabriel | B24B 49/10 |
| 2022/0063104 | A1 | 3/2022 | Huang | |
| 2022/0161357 | A1 | 5/2022 | Diwinsky | |

FOREIGN PATENT DOCUMENTS

| | | |
|---|---|---|
| CN | 109291048 B | 11/2020 |
| CN | 111941425 B | 2/2023 |
| CN | 115365956 B | 10/2023 |
| WO | 2022165739 A1 | 8/2022 |

OTHER PUBLICATIONS

EP Search Report for EP Patent Application 23220646.6 dated Aug. 9, 2024.

* cited by examiner

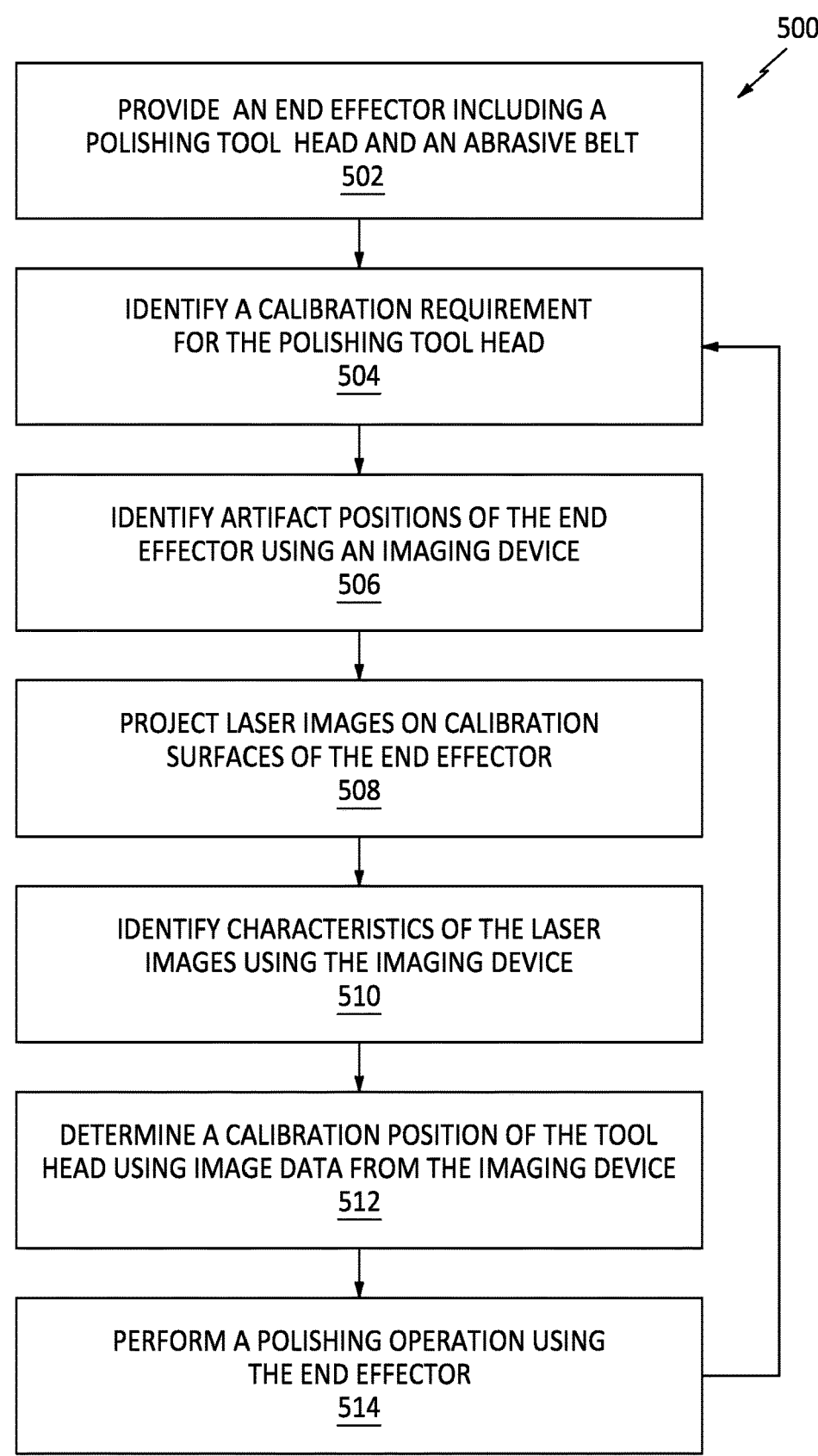

500

PROVIDE  AN END EFFECTOR INCLUDING A
POLISHING TOOL  HEAD AND AN ABRASIVE BELT
502

IDENTIFY A CALIBRATION REQUIREMENT
FOR THE POLISHING TOOL HEAD
504

IDENTIFY ARTIFACT POSITIONS OF THE END
EFFECTOR USING AN IMAGING DEVICE
506

PROJECT LASER IMAGES ON CALIBRATION
SURFACES OF THE END EFFECTOR
508

IDENTIFY CHARACTERISTICS OF THE LASER
IMAGES USING THE IMAGING DEVICE
510

DETERMINE A CALIBRATION POSITION OF THE TOOL
HEAD USING IMAGE DATA FROM THE IMAGING DEVICE
512

PERFORM A POLISHING OPERATION USING
THE END EFFECTOR
514

FIG. 5

ROBOTIC POLISHING SYSTEM AND METHOD FOR USING SAME

This application claims priority to U.S. Patent Appln. No. 63/435,486 filed Dec. 27, 2022, which is hereby incorporated herein by reference in its entirety.

TECHNICAL FIELD

This disclosure relates generally to robotic machining systems, more particularly, to systems and methods for calibrating robotic machining systems.

BACKGROUND OF THE ART

Robotic machining systems may be used to accomplish one or more machining (e.g., polishing) operations for the manufacture of components. Various robotic machining systems are known in the art. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a polishing system includes an end effector, a calibration system, and a controller. The end effector includes a polishing arm, a motor, and a tool head. The motor is mounted at a distal end of the polishing arm. The tool head extends along a lengthwise axis between and to an inner end and a tip end. The inner end is disposed on the polishing arm at the motor. The tool head includes a belt tensioner and a roller. The belt tensioner is configured to bias the tip end outward from the inner end along the lengthwise axis. The roller is rotatable about a tool center point of the tool head at the tip end. The tool head is configured to retain an abrasive belt extending between the motor and the roller. The calibration system includes an imaging device. The controller is in signal communication with the calibration system. The controller includes a processor in communication with a non-transitory memory storing instructions, which instructions when executed by the processor, cause the processor to: control the imaging device to acquire image data for the tool head, identify a position of the tool center point using the image data, and store the identified position of the tool center point in the memory.

In any of the aspects or embodiments described above and herein, the instructions, when executed by the processor, may further cause the processor to acquire the image data for the tool head by capturing a plurality of 2D images of the tool head with the imaging device.

In any of the aspects or embodiments described above and herein, the tool head may include one or more first artifacts and the instructions, when executed by the processor, may further cause the processor to identify the position of the tool center point by identifying positions of the one or more first artifacts using the image data.

In any of the aspects or embodiments described above and herein, the calibration system may system include a laser device and the instructions, when executed by the processor, may further cause the processor to control the laser device to project a first laser image on the tool head, control the imaging device to acquire the image data including the first laser image, and identify the position of the tool center point using the image data.

In any of the aspects or embodiments described above and herein, the polishing arm may include a calibration panel, the calibration panel may include a calibration surface and one or more second artifacts disposed on the calibration surface, and the instructions, when executed by the processor, may further cause the processor to identify the position of the tool center point by identifying positions of the one or more second artifacts using the image data.

In any of the aspects or embodiments described above and herein, the instructions, when executed by the processor, may further cause the processor to control the laser device to project a second laser image on the calibration surface, control the imaging device to acquire the image data including the second laser image, and identify the position of the tool center point using the image data.

In any of the aspects or embodiments described above and herein, the instructions, when executed by the processor, may further cause the processor to identify the position of the tool center point by generating a digital model of the end effector using the image data and comparing the digital model to a baseline digital model of the end effector having the belt tensioner in a fully compressed condition.

In any of the aspects or embodiments described above and herein, the belt tensioner may include a tool guide, a tool extension, and a biasing member. The tool guide may be disposed at the inner end. The tool extension may be disposed at the tip end. The biasing member may be configured to bias the tool extension outward from the tool guide along the lengthwise axis.

In any of the aspects or embodiments described above and herein, the tool extension may include a first lateral side, a second lateral side, a flat portion, and one or more first artifacts. The flat portion may be disposed on the second lateral side. The one or more first artifacts may be disposed on the flat portion. The instructions, when executed by the processor, may further cause the processor to identify the position of the tool center point by identifying positions of the one or more first artifacts using the image data.

According to another aspect of the present disclosure, a method for calibrating a tool head position for a tool head of a polishing system is provided. The method includes identifying a calibration requirement for the tool head. The tool head extends between and to an inner end and a tip end. The tool head includes an abrasive belt, a belt tensioner, a roller, and one or more first artifacts. The abrasive belt is disposed on the belt tensioner and the roller. The belt tensioner biases the tip end outward from the inner end to apply a tension to the abrasive belt. The roller is rotatable about a tool center point of the tool head at the tip end. The method further includes identifying positions of the tool center point and the one or more first artifacts, projecting a first laser image on the tool head, identifying image characteristics of the first laser image, and calibrating the tool head position by determining a calibration position of the tool center point using: the identified positions of the tool center point and the one or more first artifacts and the identified image characteristics of the first laser image.

In any of the aspects or embodiments described above and herein, the method may further include installing the abrasive belt on the tool head. The calibration requirement may be based on the installation of the abrasive belt.

In any of the aspects or embodiments described above and herein, the method may further include installing the abrasive belt on the tool head. The calibration requirement may be based on a measure of abrasive belt usage exceeding a usage threshold.

In any of the aspects or embodiments described above and herein, the usage threshold may have a first value during a first portion of a useful life of the abrasive belt and the usage threshold may have a second value during a second portion of the useful life of the abrasive belt. The first value may be different than the second value.

In any of the aspects or embodiments described above and herein, identifying the positions of the tool center point and the one or more first artifacts may include acquiring 2D image data for the tool head by capturing a plurality of 2D images of the tool head.

In any of the aspects or embodiments described above and herein, projecting the first laser image on the tool head may include identifying a calibration surface of the tool head using the identified positions of the one or more first artifacts and projecting the first laser image on the calibration surface.

In any of the aspects or embodiments described above and herein, identifying image characteristics of the first laser image may include acquiring 2D image data for the first laser image by capturing a plurality of 2D images of the tool head.

In any of the aspects or embodiments described above and herein, the image characteristics may include at least one of a size, a shape, or an alignment of the first laser image.

According to another aspect of the present disclosure, a polishing system includes a robotic polishing assembly and a calibration system. The robotic polishing assembly includes a robotic arm and an end effector. The robotic arm includes a plurality of movable joints extending between and to a base end and a distal end. The end effector is disposed at the distal end. The end effector includes a polishing arm, a motor, and a tool head. The polishing arm includes one or more second artifacts. The motor is mounted on the polishing arm. The tool head extends along a lengthwise axis between and to an inner end and a tip end. The inner end is disposed on the polishing arm at the motor. The tool head includes a belt tensioner, a roller, and one or more first artifacts. The belt tensioner is configured to bias the tip end outward from the inner end along the lengthwise axis. The roller is rotatable about a tool center point of the tool head at the tip end. The tool head is configured to retain an abrasive belt extending between the motor and the roller. The calibration system includes a laser device and an imaging device. The laser device is configured to project a first laser image on the tool head and to project a second laser image on the polishing arm. The imaging device is configured to capture 2D image data of the one or more first artifacts, the one or more second artifacts, the first laser image, and the second laser image.

In any of the aspects or embodiments described above and herein, the belt tensioner may include a tool guide, a tool extension, and a biasing member. The tool guide may be disposed at the inner end. The tool extension may be disposed at the tip end. The biasing member configured to bias the tool extension outward from the tool guide along the lengthwise axis.

In any of the aspects or embodiments described above and herein, the tool extension may include a first lateral side, a second lateral side, and a flat portion. The flat portion may be disposed on the second lateral side. The one or more first artifacts may be disposed on the flat portion.

The present disclosure, and all its aspects, embodiments and advantages associated therewith will become more readily apparent in view of the detailed description provided below, including the accompanying drawings.

DESCRIPTION OF THE DRAWINGS

FIG. 5 illustrates a block diagram depicting a method for calibrating a tool head position for a polishing system, in accordance with one or more embodiments of the present disclosure.

DETAILED DESCRIPTION

Figure 1:
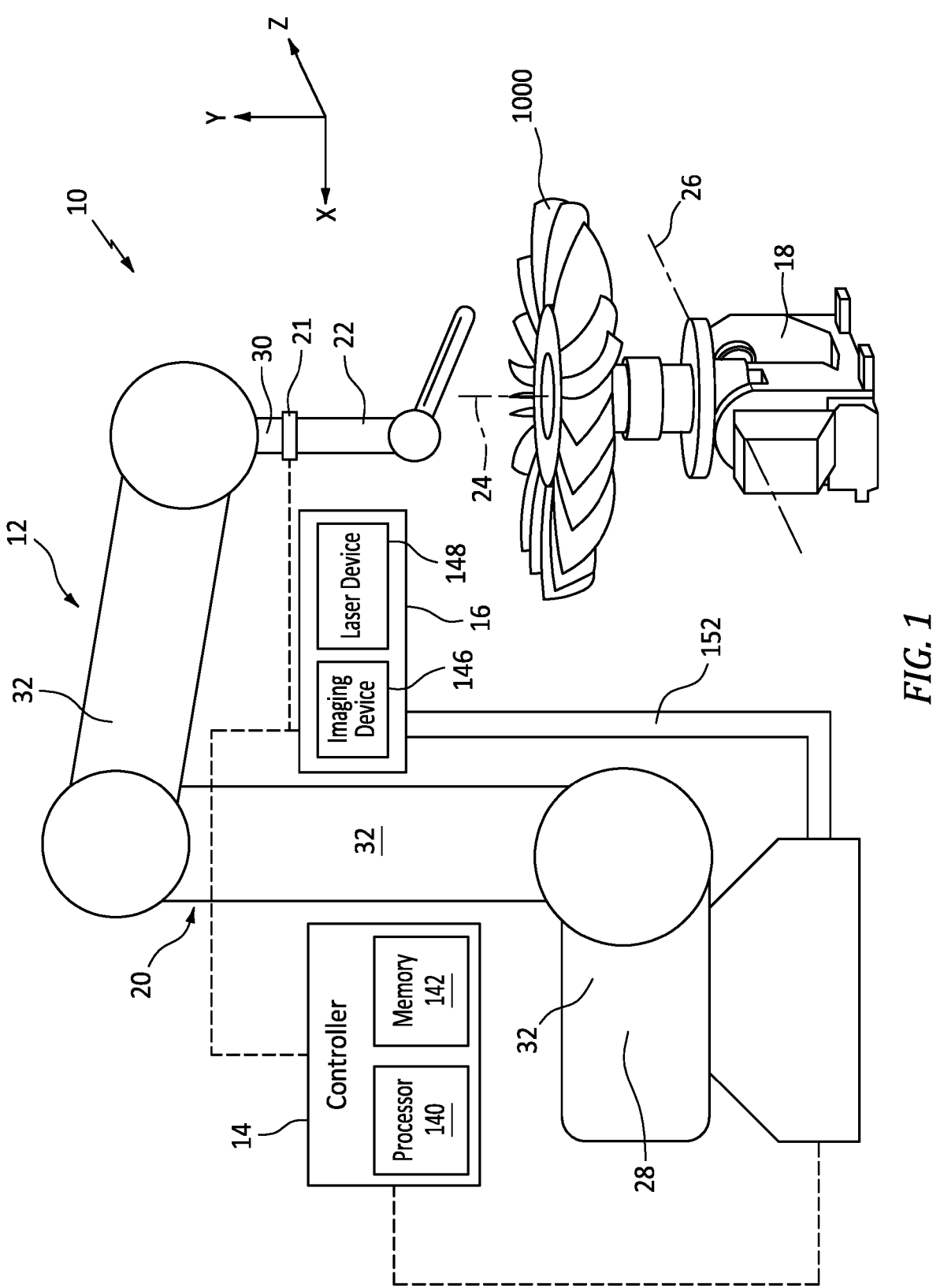
FIG. 1 diagrammatically illustrates a polishing system, in accordance with one or more embodiments of the present disclosure.

FIG. 1 illustrates a polishing system 10 for use in the manufacture of a workpiece 1000. The present disclosure polishing system 10 may provide particular utility when implemented for polishing workpiece 1000 surfaces having complex curvatures, restrictive machining tolerances, and/or hard metals or metal alloys such as, but not limited to, titanium. As an example, the workpiece 1000 of FIG. 1 is a bladed disk ("blisk") for a gas turbine engine fan for an aircraft propulsion system. The present disclosure, however, is not limited to any particular workpiece 1000 type, configuration, or material. Moreover, while the polishing system 10 is discussed herein with respect to the performance of polishing processes, aspects of the present disclosure may also be applicable to grinding or other machining processes. The polishing system 10 of FIG. 1 includes a robotic polishing assembly 12, a controller 14, and a calibration system 16. The polishing system 10 may be located within or otherwise include an enclosure (not shown) to contain dust and/or other particulate (e.g., titanium dust) which may be produced during a polishing process and which may present fire and/or explosion risk.

The robotic polishing assembly 12 of FIG. 1 provides automated control of one or more machining tools (e.g., polishing tools) based on coded programming instructions executed by a controller (e.g., the controller 14). The robotic polishing assembly 12 of FIG. 1 includes a workpiece positioning fixture 18, a robotic arm 20, a force control device 21, and an end effector 22. To be clear, this robotic polishing assembly 12 configuration of FIG. 1 is exemplary, and the present disclosure polishing system 10 is not limited to use with the particular robotic polishing assembly 12 configuration of FIG. 1.

The workpiece positioning fixture 18 is configured to securely retain and position the workpiece 1000 for a polishing process and/or another machining process. For example, the workpiece positioning fixture 18 may be configured to rotate the workpiece 1000 a first axis 24. The workpiece positioning fixture 18 may additionally or alternatively be configured to rotate (e.g., tilt the workpiece 1000) about a second axis 26. The second axis 26 may be perpendicular to the first axis 24.

The robotic arm 20 includes a base end 28, a distal end 30, and one or more moveable joints 32. Each movable joint 32 may be moved or otherwise controlled, for example, by an independent servo motor or other actuator (not shown). The distal end 30 is connected to the end effector 22. The robotic arm 20 is configured move the end effector 22 relative to the workpiece 1000 and/or to another component or assembly (e.g., a cleaning assembly) of the polishing system 10. For example, the robotic arm 20 may be configured to move the end effector 22 along an x-axis, a y-axis, and a z-axis, as well as to rotate the end effector 22 relative to the x-axis, the y-axis, and the z-axis (e.g., pitch, yaw, and roll).

The force control device 21 connects the robotic arm 20 to the end effector 22. The force control device 21 may be mounted on the distal end 30 of the robotic arm 20. The force control device 21 may be disposed at (e.g., on, adjacent, or proximate) the end effector 22 and may be directly or indirectly mounted to the end effector 22. The force control device 21 may be configured, for example, as an active contact flange including a pneumatic linear actuator (e.g., a bellow-type pneumatic linear actuator) or other linear actuator configured to translate along an axis (e.g., a single, linear axis) to control a position of the end effector 22 relative to the robotic arm 20. The force control device 21 may additionally include a compressor and/or a pressure control assembly (e.g., a pressure control valve) configured to control an air pressure within the pneumatic linear actuator and, thereby, control a linear position of the pneumatic linear actuator including a fully extended position, a fully retracted position, or a plurality of intermediate linear positions between the fully extended position and the fully retracted position. The force control device 21 may additionally include a pressure sensor configured to measure an air pressure within the pneumatic linear actuator. The force control device 21 may be connected in signal communication with the controller 14, for example, to facilitate positional control of the force control device 21 by the controller 14 and to transmit pressure measurements from the pressure sensor to the controller 14. The pressure measurements from the pressure sensor may facilitate calculation, by the controller 14, of force applied (e.g., to a workpiece) by the end effector 22. Exemplary configurations of the force control device 21 may include, but are not limited to, those sold under the ACF® trademark by FerRobotics Compliant Robot Technology GmbH (Austria).

Figure 2:
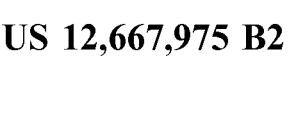
FIG. 2 illustrates a perspective view of an end effector for a polishing system, in accordance with one or more embodiments of the present disclosure.
Figure 3:
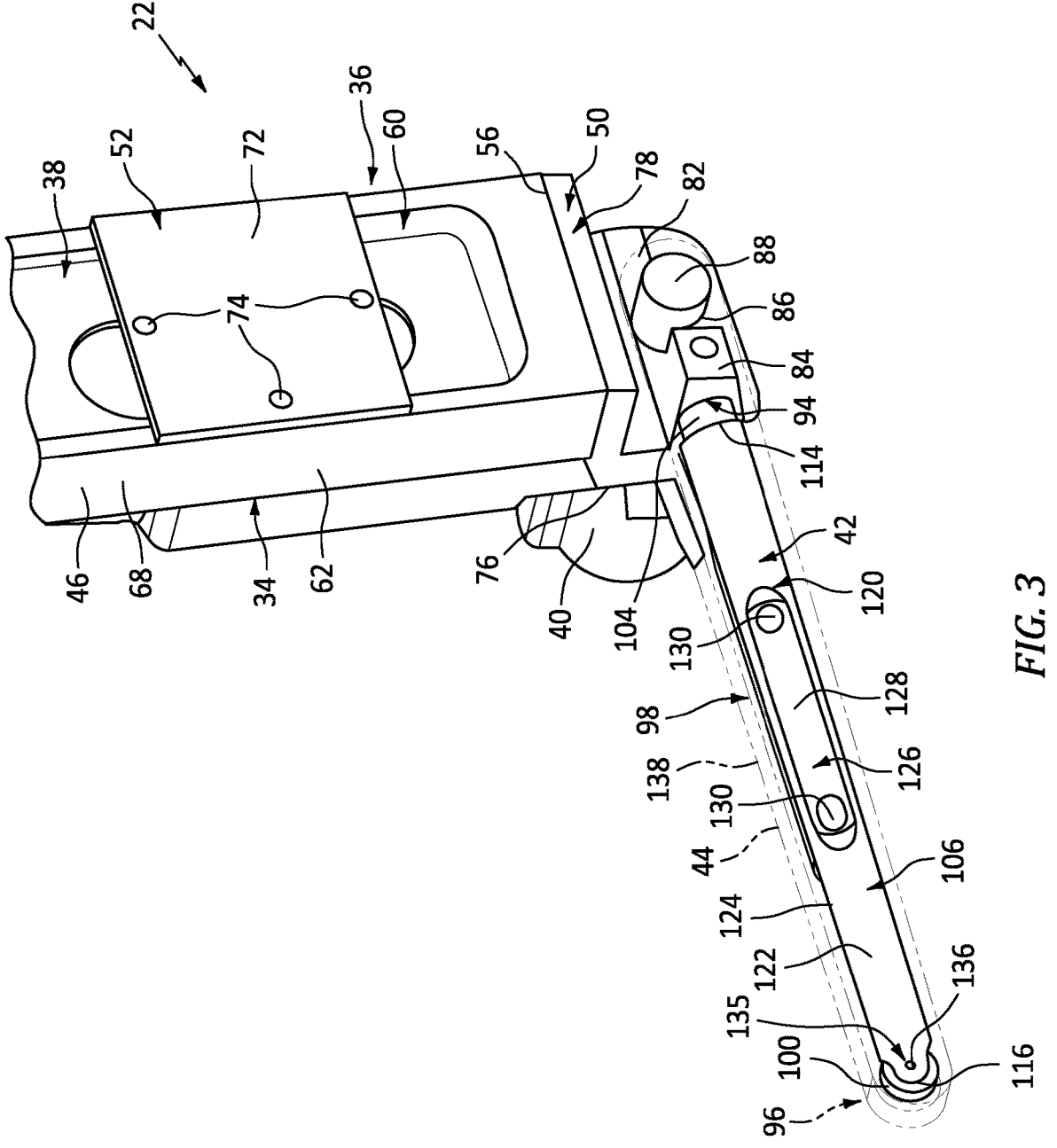
FIG. 3 illustrates another perspective view of an end effector for a polishing system, in accordance with one or more embodiments of the present disclosure.

FIGS. 2 and 3 illustrate perspective views of the end effector 22. The end effector 22 of FIGS. 2 and 3 has a first lateral side 34 and a second lateral side 36. The end effector 22 of FIGS. 2 and 3 includes a polishing arm 38, a motor 40, a tool head 42, and an abrasive belt 44. The polishing system 10 (see FIG. 1) may be configured to selectively attach and detach different end effectors 22 to facilitate polishing system 10 performance of different polishing operations or to replace degraded or faulty end effectors 22.

The polishing arm 38 of FIG. 2 includes an arm body 46, an attachment flange 48, and a motor housing 50. The polishing arm 38 may additionally include a calibration panel 52. The arm body 46 extends (e.g., lengthwise) between and to a proximate end 54 of the arm body 46 and a distal end 56 of the arm body 46. The arm body 46 of FIG. 2 has a first lateral side 58, a second lateral side 60, a front side 62, and a rear side 64. Each of the first lateral side 58, the second lateral side 60, the front side 62, and the rear side 64 extend between and to the proximate end 54 and the distal end 56. The first lateral side 58 and the second lateral side 60 may respectively correspond with the first lateral side 34 and the second lateral side 36. The arm body 46 may include a first body portion 66 and a second body portion 68. The first body portion 66 may extend from the proximate end 54 to the second body portion 68. The second body portion 68 may extend from the first body portion 66 to the distal end 56. The first body portion 66 and the second body portion 68 may extend transversely relative to one another. For example, the first body portion 66 and the second body portion 68 may form an angle α of the arm body 46, which angle α may be understood to be disposed on an imaginary plane extending through the front side 62 and the rear side 64. The arm body 46 of FIG. 2 is illustrated with an angle α of approximately forty-five degrees (45°), however, the present disclosure is not limited to any particular angle α of the arm body 46. The angle α of the arm body 46 may facilitate positioning of the tool head 42 relative to the workpiece 1000 by the robotic arm 20 (see FIG. 1). The arm body 46 may form one or more apertures 70 extending through the arm body 46, for example, from the first lateral side 58 to the second lateral side 60. The apertures 70 may facilitate a reduction in weight of the arm body 46 while also facilitating access and directing pneumatic conduits, sensors cables, and the like for the end effector 22.

The attachment flange 48 is mounted to or otherwise disposed at (e.g., on, adjacent, or proximate) the proximate end 54. The attachment flange 48 is selectively attachable to the robotic arm 20, for example, at (e.g., on, adjacent, or proximate) the force control device 21.

The motor housing 50 is mounted to or otherwise disposed at (e.g., on, adjacent, or proximate) the distal end 56. The motor housing 50 has a first lateral side 76 and a second lateral side 78. The first lateral side 76 and the second lateral side 78 may respectively correspond with the first lateral side 34 and the second lateral side 36. The motor housing 50 includes a housing body 80. The housing body 80 of FIGS. 2 and 3 includes a first mount portion 82 and a second mount portion 84. The first mount portion 82 extends along the first lateral side 76. The first mount portion 82 forms a shaft aperture 86 through the first mount portion 82 in a direction from the first lateral side 76 toward the second lateral side 78. The first mount portion 82 is configured to receive and support the motor 40 at (e.g., on, adjacent, or proximate) the first lateral side 76. The second mount portion 84 extends (e.g., laterally extends) from the first mount portion 82 toward the second lateral side 78. The second lateral side 78 is open to allow the abrasive belt 44 to be installed on and removed from the motor 40.

The calibration panel 52 of FIG. 3 is disposed on the arm body 46 (e.g., the second body portion 68) at (e.g., on, adjacent, or proximate) the second lateral side 60. The calibration panel 52 includes a calibration surface 72 and one or more artifacts 74. The calibration surface 72 may be flat (e.g., planar or substantially planar). The calibration surface 72 faces away from the arm body 46. The artifacts 74 are disposed on the calibration surface 72. The artifacts 74 may include a localized marking, discoloration, projection, indentation, or the like which is identifiable by a machine vision system (e.g., the calibration system 16) as a calibration reference point. The calibration panel 52 of FIG. 3 includes three artifacts 74 on the calibration surface 72, however, the present disclosure is not limited to any particular number of artifacts 74 for the calibration surface 72.

The motor 40 is mounted to or otherwise disposed at (e.g., on, adjacent, or proximate) the motor housing 50. For example, the motor 40 of FIGS. 2 and 3 is mounted on the first mount portion 82 on the first lateral side 76. The motor 40 includes a rotatable shaft 88. The rotatable shaft 88 extends (e.g., laterally extends) through the shaft aperture 86 to an interior of the motor housing 50. The motor 40 is configured to rotate the rotatable shaft 88 to drive the abrasive belt 44 for a polishing process. The motor 40 of FIGS. 2 and 3 is configured as a pneumatic motor, which pneumatic motor is configured to be driven by a pressurized gas (e.g., air) directed to the motor 40 by a pneumatic conduit 90. The use of a pneumatic motor for the motor 40 may eliminate or reduce the occurrence of sparks during motor 40 operation, thereby facilitating improvements in safety for applications of the present disclosure polishing system 10 (see FIG. 1) which may generate quantities of volatile particulate such as titanium or other metal dust. The present disclosure, however, is not limited to the use of a pneumatic motor for the motor 40, and the motor 40 may alternatively be configured, for example, as an electric motor.

Figure 4:
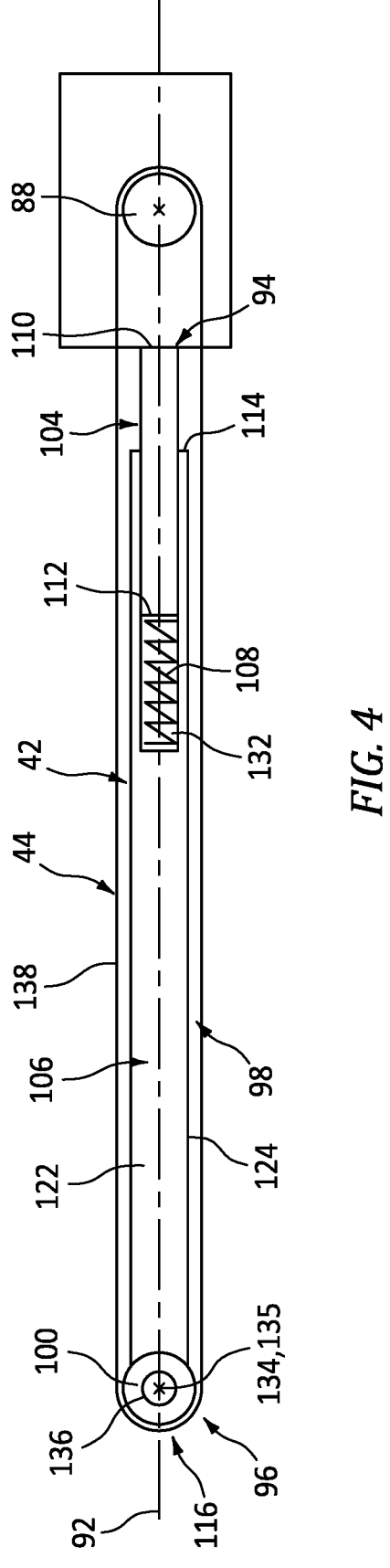
FIG. 4 illustrates a cutaway, side view of a portion of a tool head for a polishing system end effector, in accordance with one or more embodiments of the present disclosure.

Referring to FIGS. 2-4, the tool head 42 extends along a lengthwise axis 92 between and to an inner end 94 of the tool head 42 and a tip end 96 of the tool head 42. The inner end 94 is disposed at (e.g., on, adjacent, or proximate) the polishing arm 38 (e.g., the motor housing 50). The lengthwise axis 92 may extend orthogonally or substantially orthogonally relative to the arm body 46 (e.g., a lengthwise dimension of the second body portion 68). The present disclosure, however, is not limited to this particular orientation of the lengthwise axis 92 relative to the polishing arm 38. For example, the lengthwise axis 92 may be oriented at any suitable angle relative to the arm body 46 including a colinear orientation of the lengthwise axis 92 relative to the arm body 46. The tool head 42 of FIGS. 2-4 includes a belt tensioner 98 and a roller 100. The tool head 42 may additionally include a retaining shoulder screw 65.

The belt tensioner 98 includes a tool guide 104, a tool extension 106, and a biasing member 108. The tool guide 104 is disposed at (e.g., on, adjacent, or proximate) the inner end 94. The tool guide 104 extends (e.g., lengthwise) between and to a first end 110 of the tool guide 104 and a second end 112 of the tool guide 104. The first end 110 is mounted to or otherwise disposed at (e.g., on, adjacent, or proximate) the motor housing 50. For example, the first end 110 of FIGS. 2-4 is mounted (e.g., fixedly mounted) to the second mount portion 84. The tool guide 104 may be configured as a cylindrical body, however, the present disclosure is not limited to any particular shape of the tool guide 104.

The tool extension 106 is disposed at (e.g., on, adjacent, or proximate) the tip end 96. The tool extension 106 extends (e.g., lengthwise) between and to a first end 114 of the tool extension 106 and a second end 116 of the tool extension 106. The tool extension 106 has a first lateral side 118 and a second lateral side 120. The first lateral side 118 and the second lateral side 120 may respectively correspond with the first lateral side 34 and the second lateral side 36. The tool extension 106 includes an extension body 122 extending from the first end 114 to the second end 116. The extension body 122 includes an exterior surface 124 and a flat portion 126. The exterior surface 124 extends between the first end 114 and the second end 116. The exterior surface 124 extends circumferentially about (e.g., completely around) the lengthwise axis 92, except at the location of the flat portion 126. For example, the extension body 122 may generally be configured as a cylindrical body, except at the location of the flat portion 126. As shown in FIGS. 2 and 3, the flat portion 126 may be disposed on the second lateral side 120. For example, the flat portion 126 may be disposed only on the second lateral side 120 (e.g., not on the first lateral side 118). The flat portion 126 extends (e.g., lengthwise) along the second lateral side 120 a portion of a distance between the first end 114 and the second end 116. For example, the flat portion 126 may be spaced from the first end 114 and/or the second end 116. The flat portion 126 includes a calibration surface 128 and one or more artifacts 130. The calibration surface 128 may be flat (e.g., planar or substantially planar). The artifacts 130 may include a localized marking, discoloration, projection, indentation, or the like which is identifiable by a machine vision system (e.g., the calibration system 16) as a calibration reference point. The flat portion 126 of FIG. 3 includes two artifacts 130 on the calibration surface 128, however, the present disclosure is not limited to any particular number of artifacts 130 for the calibration surface 128. As shown in FIG. 3, a first of the artifacts 130 may be disposed at (e.g., on, adjacent, or proximate) a first lengthwise end of the calibration surface 128 while a second of the artifacts 130 may be disposed at (e.g., on, adjacent, or proximate) a second lengthwise end of the calibration surface 128, opposite the first lengthwise end. The present disclosure, however, is not limited to the particular artifact 130 orientations of FIG. 3.

The extension body 122 forms an internal bore 132 as shown, for example, in FIG. 4. The internal bore 132 extends from the first end 114 toward the second end 116. The internal bore 132 is configured to receive the tool guide 104 (e.g., the second end 112) and to facilitate axial translation (e.g., along the lengthwise axis 92) of the tool extension 106 relative to the tool guide 104.

The biasing member 108 of FIG. 4 is disposed within the internal bore 132. The biasing member 108 is disposed between (e.g., axially between) the tool guide 104 (e.g., the second end 112) and the extension body 122, with respect to the lengthwise axis 92. The biasing member 108 is configured to bias the tool extension 106 away from (e.g., axially away from) the tool guide 104 to apply a tension to the abrasive belt 44 installed on the tool head 42. The biasing member 108 of FIG. 4 is configured as a spring, however, the present disclosure is not limited to the use of a spring for the biasing member 108.

The retaining shoulder screw 65 is adjustably mounted to (e.g., screwed into) the motor housing 50 (e.g., the second mount portion 84) adjacent (e.g., radially adjacent with respect to the lengthwise axis 92) the tool head 42 (e.g., the tool guide 104 and the tool extension 106). The retaining shoulder screw 65 may include an enlarged head at a distal end of the retaining shoulder screw 65 opposite the motor housing 50. The extension body 122 may include or otherwise form a guiding feature 67. The guiding feature 67 may be disposed axially coincident with the retaining shoulder screw 65, relative to the lengthwise axis 92. As shown in FIG. 2, for example, the guiding feature 67 may include two arms projecting radially outward from the extension body 122, relative to the lengthwise axis. The two arms may form a U-shape body of the guiding feature 67, which U-shape body may partially circumscribe the retaining shoulder screw 65. In some embodiments, the guiding feature 67 may fully circumscribe the retaining shoulder screw 65. The present disclosure, however, is not limited to the foregoing exemplary configuration of the guiding feature 67. The guiding feature 67 may limit axial movement of the tool extension 106, relative to the lengthwise axis 92. For example, the retaining shoulder screw 65 and the guiding feature 67 may define a fully extended position of the tool extension 106 where the guiding feature 67 contacts the head of the retaining shoulder screw 65, thereby preventing further axial extension of the tool extension 106 from the biasing member 108. The guiding feature 67 may further limit or prevent circumferential movement of the extension body 122, thereby circumferentially fixing or substantially circumferentially fixing the extension body 122 relative to the motor housing 50 and/or the tool guide 104. The axial and circumferential guidance and restraint provided by the retaining shoulder screw 65 and the guiding feature 67 facilitates improved precision and repeatability for polishing operations using the present disclosure polishing arm 38.

The roller 100 is disposed at (e.g., on, adjacent, or proximate) the tip end 96. The roller 100 is configured to rotate about a rotational axis 134 disposed at a tool center point 135 of the tool head 42. The rotational axis 134 may extend (e.g., laterally extend) through the first lateral side 118 and the second lateral side 120. The roller 100 may be configured with a cylindrical shape, or torus shape, or another suitable shape for controlling movement of the abrasive belt 44. The rotational axis 134 (e.g., the tool center point 135) may be formed by a roller body 136 such as, but not limited to, a shaft, a pin, a dowel, or the like, about which the roller 100 may rotate. The roller body 136 may function, for example, as an artifact (e.g., the artifacts 74, 130) which is identifiable by a machine vision system (e.g., the calibration system 16) as a calibration reference point, thereby facilitating the determination of a position and an orientation of the tool center point 135 using the calibration system 16.

The abrasive belt 44 is installed on the tool head 42 in rotational communication with the rotatable shaft 88 and the roller 100. The abrasive belt 44 includes an abrasive outer surface 138 which is configured for polishing, grinding, or otherwise machining one or more surfaces of a workpiece (e.g., the workpiece 1000). The abrasive outer surface 138 may be configured with a degree of abrasiveness (e.g., coarseness, grit, etc.) which may be selected for a particular polishing operation or workpiece surface). The belt tensioner 98 applies a suitable tension to the abrasive belt 44 to secure the abrasive belt 44 on the rotatable shaft 88 and the roller 100 and to allow the abrasive belt 44 to be driven (e.g., moved) along a path between the rotatable shaft 88 and the roller 100 by rotation of the rotatable shaft 88.

Referring again to FIG. 1, the controller 14 of FIG. 1 is connected in signal communication with the robotic polishing assembly 12 and the calibration system 16. The controller 14 includes a processor 140 and memory 142. The memory 142 is connected in signal communication with the processor 140. The processor 140 may include any type of computing device, computational circuit, or any type of process or processing circuit capable of executing a series of instructions that are stored in the memory 142, thereby causing the processor 140 to perform or control one or more steps or other processes. The processor 140 may include multiple processors and/or multicore CPUs and may include any type of processor, such as a microprocessor, digital signal processor, co-processors, a micro-controller, a micro-computer, a central processing unit, a field programmable gate array, a programmable logic device, a state machine, logic circuitry, analog circuitry, digital circuitry, etc., and any combination thereof. The instructions stored in memory 142 may represent one or more algorithms for controlling aspects of the robotic polishing assembly 12 and/or the calibration system 16, and the stored instructions are not limited to any particular form (e.g., program files, system data, buffers, drivers, utilities, system programs, etc.) provided they can be executed by the processor 140. The instructions stored in memory 142 may be in the form of G-code, M-code, or another suitable programming language which can be executed by the controller 14 and/or its processor 140. The instructions stored in memory 142 may be generated by computer-aided design (CAD) or computer-aided manufacturing (CAM) software, whereby the physical dimensions of a particular workpiece (e.g., the workpiece 1000) may be translated into instructions (e.g., computer numerical control (CNC) instructions) for execution by the robotic polishing assembly 12. The memory 142 may be a non-transitory computer readable storage medium configured to store instructions that when executed by one or more processors, cause the one or more processors to perform or cause the performance of certain functions. The memory 142 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 14 may be achieved via the use of hardware, software, firmware, or any combination thereof. The controller 14 may also include input and output devices (e.g., keyboards, buttons, switches, touch screens, video monitors, sensor readouts, data ports, etc.) that enable the operator to input instructions, receive data, etc.

The calibration system 16 of FIG. 1 includes an imaging device 146, a laser device 148, and a support fixture 152. The imaging device 146 may be configured as a two-dimensional (2D) camera, a three-dimensional (3D) camera, or other suitable imaging device configured to capture 2D images (e.g., 2D image data) and/or 3D images (e.g., 3D image data) of the end effector 22. The laser device 148 is configured to project a laser image (e.g., a line) onto the end effector 22 (e.g., the calibration surfaces 72, 128), which laser image is visible to the imaging device 146. The support fixture 152 is configured to support the imaging device 146 and the laser device 148 in a position relative to the end effector 22, for example, with a line-of-sight to the artifacts 74, the artifacts 130, the calibration surface 72, the calibration surface 128, and the roller body 136. The support fixture 152 may be mounted to or formed by the robotic polishing assembly 12. The support fixture 152 may be fixed (e.g., relative to the robotic polishing assembly 12 (e.g., a fixed portion of the robotic polishing assembly 12 such as the base end 28) or to a machine coordinate system for the robotic polishing assembly 12. Alternatively, the support fixture 152 may be movable to position the imaging device 146 and the laser device 148 relative to the end effector 22. For example, the support fixture 152 may be movable to position the imaging device 146 and the laser device 148 in one of a deployed position or a stowed position. The deployed position may be a position in which the imaging device 146 and the first laser device 148 have a line-of-sight to the artifacts 74, the artifacts 130, the calibration surface 72, the calibration surface 128, and the roller body 136. The stowed position may be a position in which the imaging device 146 and the laser device 148 are positioned (e.g., in an enclosure (not shown)) to protect the imaging device 146 and the laser device 148 from dust, debris, or other particulate generated during a polishing operation. Operation of the calibration system 16 may be controlled by the controller 14. Alternatively, the calibration system 16 may include and be controlled by a separate controller independent of the controller 14. The calibration system 16 may include or otherwise be formed by a robotic machine vision system such as, for example, those manufactured and sold by FANUC Corporation (e.g., under the trade name FANUC iRVision).

Figure 6:
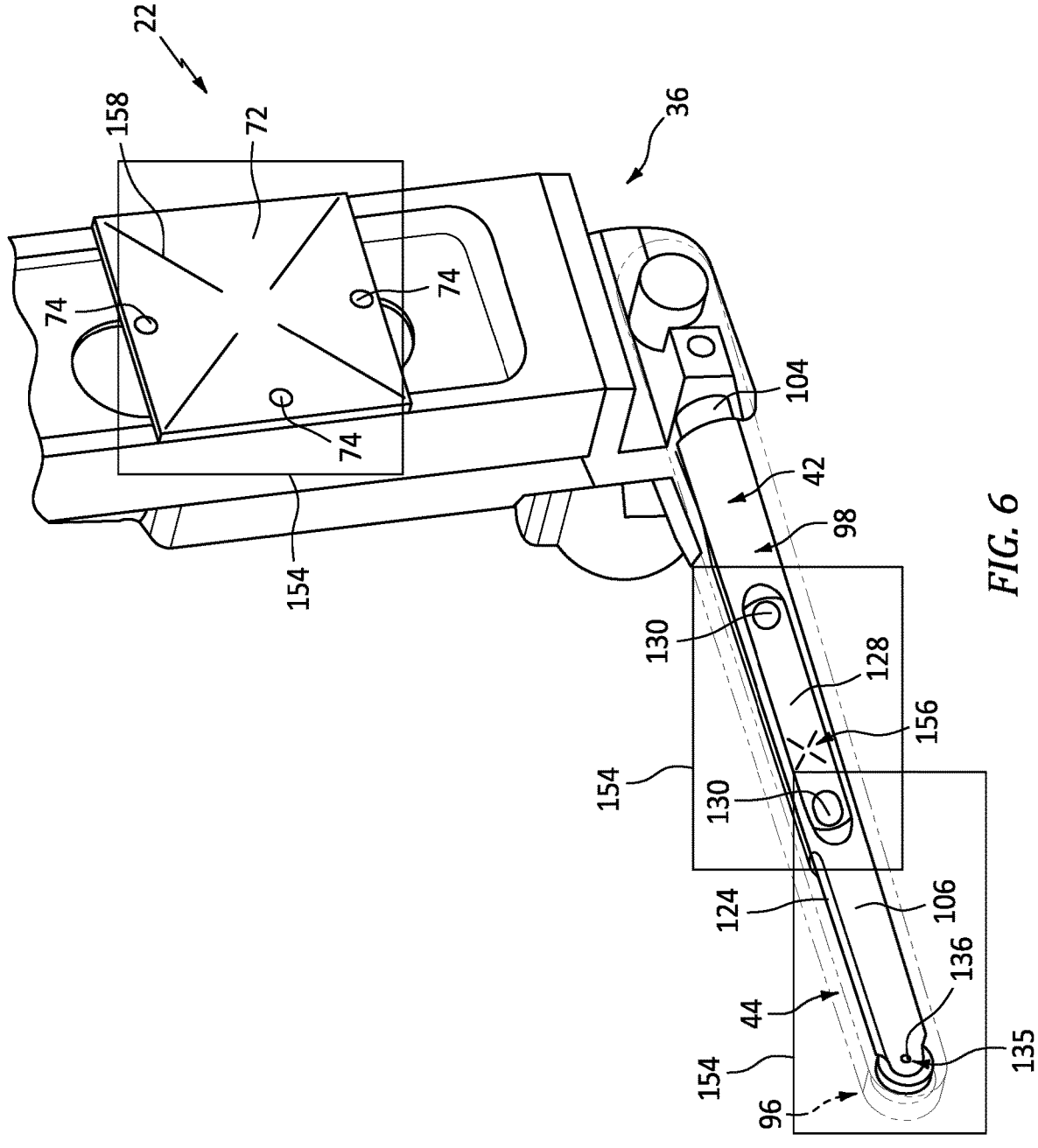
FIG. 6 illustrates another perspective view of an end effector for a polishing system, in accordance with one or more embodiments of the present disclosure.

Referring to FIGS. 1, 5, and 6, a Method 500 for calibrating a tool head position for a polishing system is provided. FIG. 5 illustrates a flowchart for the Method 500. The Method 500 may be performed for the polishing system 10, as described herein. The controller 14 may be used to execute or control one or more steps of the Method 500. For example, the processor 140 may execute instructions stored in memory 142, thereby causing the controller 14 and/or its processor 140 to execute or otherwise control one or more steps of the Method 500 using the robotic polishing assembly 12 and/or the calibration system 16. However, it should be understood that the Method 500 is not limited to use with the polishing system 10 described herein. Unless otherwise noted herein, it should be understood that the steps of Method 500 are not required to be performed in the specific sequence in which they are discussed below and, in various embodiments, the steps of Method 500 may be performed separately or simultaneously. Further, it should be understood that not all of the steps of the method 500, discussed below, may be required unless otherwise described herein.

Step 502 includes preparing the robotic polishing assembly 12 for a polishing process. Step 502 may include installing a new end effector 22 on the robotic polishing assembly 12. Additionally or alternatively, Step 502 may include installing a new abrasive belt 44 on the tool head 42. A new (e.g., previously unused) abrasive belt may be understood to have a generally unstretched condition relative to an abrasive belt which has previously been used in a polishing or other machining operation. This is because abrasive belts may be expected to experience gradual degradation through usage, which degradation may be exhibited, at least in part, by stretching of the abrasive belt. Positioned on the tool head 42, the new abrasive belt 44 may compress the belt tensioner 98 such that the biasing member 108 (see FIG. 4) is compressed between the tool extension 106 and the tool guide 104. In this condition, the tool extension 106 may be positioned at (e.g., on, adjacent, or proximate) a fully compressed position of the tool extension 106 relative to the tool guide 104. As the abrasive belt 44 is used for polishing operations, the abrasive belt 44 will stretch and the biasing member 108 will bias the tool extension 106 outward (e.g., away from the tool guide 104) to maintain suitable tension of the abrasive belt 44.

An abrasive belt may undergo a series of sequential degradation phases which are generally described herein as (1) a pre-break-in phase, (2) a break-in phase, and (3) a post-break-in phase. The pre-break-in phase may be characterized by very high rate of stretching of the abrasive belt 44 relative to the usage of the abrasive belt 44 (e.g., polishing usage as a fraction of the useful life for the abrasive belt 44). The usage of the abrasive belt 44 may be measured or otherwise estimated, for example, using a polishing operational time for the abrasive belt 44, a workpiece surface area polished using the abrasive belt 44, or any other suitable indictor of abrasive belt 44 usage. The present disclosure, however, is not limited to any particular methodology for determining or identifying abrasive belt 44 useful life. Step 502 may include operating the polishing system 10 to perform a polishing operation on a dummy component (e.g., a component which is not the workpiece 1000) while the installed abrasive belt 44 is in the pre-break-in phase. The break-in phase may be characterized by a moderate rate of stretching of the abrasive belt 44 relative to the useful life of the abrasive belt 44. The post-break-in phase may be characterized by a low rate of stretching of the abrasive belt 44 relative to the useful life of the abrasive belt 44. The post-break-in phase may encompass the majority of the useful life for the abrasive belt 44.

As the abrasive belt 44 stretches during usage (e.g., for polishing operations) and the tool extension 106 moves away from the tool guide 104 to maintain tension on the abrasive belt 44, the position of the roller body 136 (e.g., the tool center point 135) at the tip end 96 will change relative to the position of the polishing arm 38 and upstream components of the tool head 42 (e.g., the tool guide 104). For example, a length of the tool head 42 along the lengthwise axis 92 (see FIG. 4) will gradually increase. As a result, the actual position of the tool head 42 (e.g., the roller body 136) may become increasingly different than an assumed position of the tool head 42 recognized by the controller 14, which assumed position may be relied upon by the controller 14 to accurately position the tool head 42 relative to the workpiece 1000. Moreover, the rate and/or magnitude of stretching may vary between same or similar abrasive belts 44, and so it may be difficult to accurately estimate how a position of the roller body 136 will change over the useful life of the abrasive belt 44.

Step 504 includes identifying a calibration requirement for the tool head 42. For example, the controller 14 may identify that a calibration of the tool head 42 position should be performed based on one or more operating conditions of the robotic polishing assembly 12. The controller 14 may then initiate and control performance of the calibration using the robotic polishing assembly 12 and the calibration system 16. The controller 14 may identify the calibration requirement based on an installation of the end effector 22 onto the robotic polishing assembly 12 and/or an installation of the abrasive belt 44 (e.g., a new abrasive belt 44) onto the tool head 42. The controller 14 may identify the calibration requirement based on the initiation of the break-in phase for the abrasive belt 44 (e.g., before the abrasive belt 44 is first applied to the workpiece 1000 for a polishing operation). The controller 14 may identify the calibration requirement based on a measure of abrasive belt 44 usage such as, but not limited to, a polishing operational time for the abrasive belt 44 (e.g., a calibration requirement periodicity) or a workpiece surface area polished using the abrasive belt 44. For example, the controller 14 may identify the calibration requirement when the measure of abrasive belt 44 usage exceeds a usage threshold. The usage threshold for a calibration requirement may vary between different phases of the abrasive belt 44 useful life (e.g., the pre-break-in phase, the break-in phase, and the post-break-in phase). For example, during the post-break-in phase of the abrasive belt 44 the usage threshold for calibration may be greater than the usage threshold for calibration during the break-in-phase of the abrasive belt 44, due to the relatively lower stretching expected in the post-break-in phase. The usage threshold for calibration may be determined analytically and/or experimentally, and may vary depending on the abrasive belt 44 configuration and/or the particular polishing operation (e.g., the tool head 42 positioning accuracy needed for the particular polishing operation) to be performed. Routine experimentation may be performed by a person of ordinary skill in the art to determine a suitable usage threshold for calibration in accordance with and as informed by one or more aspects of the present disclosure. The controller 14 may dynamically identify that a calibration of the tool head 42 position should be performed based, for example, on an unexpected response of the robotic polishing assembly 12 such as, but not limited to, a detected collision of the tool head 42 with another object. Identifying the calibration requirement may include identifying steps of the calibration that should be performed and/or that need not be performed. As an example, calibration for the tool head 42 following an installation of the end effector 22 on the robotic polishing assembly 12 may require additional calibration steps that may not be required for other calibrations (e.g., calibration requirements based on usage).

Step 506 includes identifying positions of one or more of the artifacts 130, the artifacts 74, and/or the roller body 136 using the imaging device 146. The controller 14 may control the support fixture 152 to position the imaging device 146 with a line-of-sight to the artifacts 130, the artifacts 74, and/or the roller body 136. The retaining shoulder screw 65 and the guiding feature 67 may facilitate suitable orientation of the artifacts 130 and the roller body 136 relative to the imaging device 146 such that the artifacts 130 and the roller body 136 are visible to the imaging device 146. Each of the artifacts 130, the artifacts 74, and the roller body 136 may be disposed on or otherwise visible from a single side of the end effector 22, for example, the second lateral side 36 as shown in FIG. 6. Of course, each of the artifacts 130, the artifacts 74, and the roller body 136 may alternatively be disposed on or otherwise visible from the first lateral side 34. The controller 14 may control the robotic polishing assembly 12 (e.g., the robotic arm 20 and the force control device 21) to position the end effector 22 in a predetermined position (e.g., a calibration position defined in the calibration program executed by the controller 14). The controller 14 may further control a position and/or pressure for the force control device 21. For example, the controller 14 may control the force control device 21 to have a maximum inflation pressure and/or the fully extended position (e.g., of the pneumatic linear actuator) to maximize a stiffness of the force control device 21 while identifying the positions of the artifacts 130, the artifacts 74, and/or the roller body 136. The controller 14 may control the imaging device 146 to capture one or more images (e.g., 2D image data) of the end effector 22 and its artifacts 130, artifacts 74, and roller body 136. The controller 14 may control the imaging device 146 to capture the one or more images with the end effector 22 in the predetermined position. The controller 14 may control the imaging device 146 to capture the one or more images for each of a plurality of different predetermined positions of the end effector 22. To generate image data which is sufficient for the controller 14 to identify the artifacts 130, the artifacts 74, and/or the roller body 136, the imaging device 146 may capture a plurality of images. FIG. 6 illustrates a plurality of images 154 used to generate image data for the artifacts 130, the artifacts 74, and the roller body 136. The plurality of images 154 of FIG. 6 includes three images, however, the present disclosure is not limited to any particular number of images. The image data from the plurality of images 154 may be used by the controller 14 to identify the positions of the artifacts 130, the artifacts 74, and/or the roller body 136 relative to a machine coordinate system for the robotic polishing assembly 12. Step 506 may include capturing images of a subset of the artifacts 130, the artifacts 74, and the roller body 136. For example, a calibration requirement (see Step 504) associated with installation of the end effector 22 may include capturing images of the artifacts 130, the artifacts 74, and the roller body 136. However, subsequent calibration requirements, such as those associated with an abrasive belt 44 periodicity, may only include capturing images of the artifacts 130 and the roller body 136.

Step 508 includes projecting a first laser image 156 on the calibration surface 128 and/or projecting a second laser image 158 on the calibration surface 72. The controller 14 may control the laser device 148 to project the first laser image 156 on the calibration surface 128. Similarly, the controller 14 may control the laser device 148 to project the second laser image 158 on the calibration surface 72. The calibration surface 128 and/or the calibration surface 72 may be identified by the controller 14 using the positions of the artifacts 130 and/or the artifacts 74, respectively, identified in Step 506. As shown in FIG. 6, the first laser image 156 and the second laser image 158 may have an "X" shape. The present disclosure, however, is not limited to any particular shape for the first laser image 156 or the second laser image 158. Step 508 may include projecting one or both of the first laser image 156 and the second laser image 158. For example, a calibration requirement (see Step 504) associated with installation of the end effector 22 may include projecting both the first laser image 156 on the calibration surface 128 and the second laser image 158 on the calibration surface 72. However, subsequent calibration requirements, such as those associated with an abrasive belt 44 periodicity, may only include projecting the first laser image 156 on the calibration surface 128.

Step 510 includes identifying image characteristics of the first laser image 156 and/or the second laser image 158 using the imaging device 146. The controller 14 may control the imaging device 146 to capture one or more images (e.g., 2D image data) of the first laser image 156 and/or the second laser image 158. The imaging device 146 may capture a plurality of images such as the plurality of images 154 of FIG. 6. Image characteristics of the first laser image 156 and/or the second laser image 158 may be used by the controller 14 to identify a depth dimension for the end effector 22. In other words, the image characteristics of the first laser image 156 and/or the second laser image 158 may be used to identify the positions of the artifacts 130, the artifacts 74, and/or the roller body 136 with respect to a z-axis, so as to supplement the x-y plane positions of the artifacts 130, the artifacts 74, and/or the roller body 136 identified, for example, in Step 506. Accordingly, the controller 14 may more accurately identify the positions of the artifacts 130, the artifacts 74, and/or the roller body 136 relative to one another for a range of end effector 22 positions. The controller 14 may use the image data from Steps 506 and 510 to identify positions of the artifacts 130, the artifacts 74, and/or the roller body 136 in three-dimensional (3D) space (e.g., characterized by an x-axis, a y-axis, and a z-axis) and to determine the orientations (e.g., pitch, yaw, and roll) of the tool head 42 and/or the robotic arm 20 with respect to the x-axis, the y-axis, and the z-axis. The image data from of Step 510 may also be used by the controller 14 to identify the positions of the artifacts 130, the artifacts 74, and/or the roller body 136 along an x-y plane corresponding to the plurality of images 154. Examples of image characteristics of the first laser image 156 and/or the second laser image 158 may include, but are not limited to, a size, a shape, and an alignment of the first laser image 156 and/or the second laser image 158, or another image characteristic of the first laser image 156 and/or the second laser image 158 which may vary based on a change in relative position and/or orientation of the laser device 148 to the calibration surface 128 and/or the calibration surface 72. Step 510 may include capturing images of a subset of the artifacts 130, the artifacts 74, the roller body 136, the first laser image 156, and/or the second laser image 158. For example, a calibration requirement (see Step 504) associated with installation of the end effector 22 may include capturing images of the artifacts 130, the artifacts 74, the roller body 136, the first laser image 156, and the second laser image 158. However, subsequent calibration requirements, such as those associated with an abrasive belt 44 periodicity, may only include capturing images of the artifacts 130, the roller body 136, and the first laser image 156.

Step 512 includes determining a calibration position of the tool center point 135 by identifying a position of one or more of the artifacts 130, the artifacts 74, and/or the roller body 136 using the image data. The calibration position of the tool center point 135 may be determined for and following the capture of the one or more images for each of the predetermined positions of the end effector 22 (see Step 506). For example, the calibration position of the tool center point 135 may be determined a plurality of times to increasingly converge the calibration position of the tool center point 135 to the actual position of the tool center point 135. The calibration position of the tool center point 135 may represent an identified actual position of the tool center point 135, for example, a position of the roller body 136 relative to the polishing arm 38 (e.g., an axial position of the roller body 136 along the lengthwise axis 92). The controller 14 may compare the identified positions of the artifacts 130, the artifacts 74, and/or the roller body 136 to baseline positions of the artifacts 130, the artifacts 74, and/or the roller body 136 (e.g., stored in memory 142), to determine a change of the identified tool center point 135 position relative to the baseline tool center point 135 position. The controller 14 may convert the image data obtained in Steps 506 and/or 510 into a digital model of the end effector 22. The controller 14 may compare the digital model of the end effector 22 to a baseline digital model of the end effector 22 to determine the change of the identified tool center point 135 position relative to the baseline tool center point 135 position. The change of the identified tool center point 135 position relative to the baseline tool center point 135 position may be used by the controller 14 to determine the calibration position of the tool center point 135. The controller 14 may store the calibration position of the tool center point 135 (e.g., the identified position of the tool center point 135) in memory 142. The controller 14 may use the calibration position of the tool center point 135 stored in memory 142 for controlling the tool head 42 during subsequent polishing operations including functions such as, but not limited to, abrasive belt 44 selection and installation, abrasive belt 44 purge, tool (e.g., tool head 42 and abrasive belt 44) cleaning, and/or workpiece polishing.

Step 514 includes performing a polishing operation with the robotic polishing assembly 12 and its end effector 22 using the calibration position of the tool center point 135. Step 514 may include initiating a polishing operation or resuming a polishing operation for the installed end effector 22 and abrasive belt 44. The polishing operation of Step 514 may be performed in combination with one or more of the above-discussed steps of the Method 500. The Steps 504, 506, 508, and/or 510 may be repeatedly performed (e.g., at periodic intervals) during the polishing operation.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A polishing system comprising:
    an end effector including a polishing arm, a motor, and a tool head, the polishing arm including a calibration panel, the calibration panel including a calibration surface, the motor mounted at a distal end of the polishing arm, the tool head extending along a lengthwise axis between and to an inner end and a tip end, the inner end disposed on the polishing arm at the motor, the tool head including a belt tensioner and a roller, the belt tensioner configured to bias the tip end outward from the inner end along the lengthwise axis, the roller rotatable about a tool center point of the tool head at the tip end, the tool head configured to retain an abrasive belt extending between the motor and the roller;

a calibration system including an imaging device and a laser device; and a controller in signal communication with the calibration system, the controller including a processor in communication with a non-transitory memory storing instructions, which instructions when executed by the processor, cause the processor to:

control the laser device to project a second laser image on the calibration surface, control the imaging device to acquire image data for the tool head, the image data including the second laser image;

control the imaging device to acquire the image data including the second laser image, and identify the position of the tool center point using the image data;

identify a position of the tool center point using the image data; and store the identified position of the tool center point in the memory as a calibration position of the tool center point.

2. The polishing system of claim 1, wherein the instructions, when executed by the processor, further cause the processor to acquire the image data for the tool head by capturing a plurality of 2D images of the tool head with the imaging device.

3. The polishing system of claim 1, wherein:

the tool head includes one or more first artifacts; and the instructions, when executed by the processor, further cause the processor to identify the position of the tool center point by identifying positions of the one or more first artifacts using the image data.

4. The polishing system of claim 3, wherein:

the instructions, when executed by the processor, further cause the processor to control the laser device to project a first laser image on the tool head, control the imaging device to acquire the image data including the first laser image, and identify the position of the tool center point using the image data.

5. The polishing system of claim 1, wherein the instructions, when executed by the processor, further cause the processor to identify the position of the tool center point by generating a digital model of the end effector using the image data and comparing the digital model to a baseline digital model of the end effector having the belt tensioner in a fully compressed condition.

6. The polishing system of claim 1, wherein the belt tensioner includes a tool guide, a tool extension, and a biasing member, the tool guide disposed at the inner end, the tool extension disposed at the tip end, and the biasing member configured to bias the tool extension outward from the tool guide along the lengthwise axis.

7. The polishing system of claim 6, wherein the tool extension includes a first lateral side, a second lateral side, a flat portion, and one or more first artifacts, the flat portion disposed on the second lateral side, the one or more first artifacts disposed on the flat portion; and the instructions, when executed by the processor, further cause the processor to identify the position of the tool center point by identifying positions of the one or more first artifacts using the image data.

8. A method for calibrating a tool head position for a tool head of a polishing system, the method comprising:

identifying a calibration requirement for the tool head, the tool head extending between and to an inner end and a tip end, the tool head including an abrasive belt, a belt tensioner, a roller, and one or more first artifacts, the abrasive belt disposed on the belt tensioner and the roller, the belt tensioner including a tool guide, a tool extension, and a biasing member, the tool guide disposed at the inner end, the tool extension disposed at the tip end, the tool extension including a first lateral side, a second lateral side, and a flat portion, the flat portion disposed on the second lateral side, the one or more first artifacts disposed on the flat portion, the biasing member configured to bias the tool extension outward from the tool guide to apply a tension to the abrasive belt, the roller rotatable about a tool center point of the tool head at the tip end;

identifying positions of the tool center point and the one or more first artifacts;

projecting a first laser image on the tool head;

identifying image characteristics of the first laser image; and calibrating the tool head position by determining a calibration position of the tool center point using:

the identified positions of the tool center point and the one or more first artifacts; and the identified image characteristics of the first laser image.

9. The method of claim 8, further comprising installing the abrasive belt on the tool head, wherein the calibration requirement is based on the installation of the abrasive belt.

10. The method of claim 8, further comprising installing the abrasive belt on the tool head, wherein the calibration requirement is based on a measure of abrasive belt usage exceeding a usage threshold.

11. The method of claim 10, wherein the usage threshold has a first value during a first portion of a useful life of the abrasive belt and the usage threshold has a second value during a second portion of the useful life of the abrasive belt, the first value different than the second value.

12. The method of claim 8, wherein identifying the positions of the tool center point and the one or more first artifacts includes acquiring 2D image data for the tool head by capturing a plurality of 2D images of the tool head.

13. The method of claim 8, wherein projecting the first laser image on the tool head includes identifying a calibration surface of the tool head using the identified positions of the one or more first artifacts and projecting the first laser image on the calibration surface.

14. The method of claim 8, wherein identifying image characteristics of the first laser image includes acquiring 2D image data for the first laser image by capturing a plurality of 2D images of the tool head.

15. The method of claim 14, wherein the image characteristics include at least one of a size, a shape, or an alignment of the first laser image.

16. A polishing system comprising:

a robotic polishing assembly including a robotic arm and an end effector, the robotic arm including a plurality of movable joints extending between and to a base end and a distal end, the end effector disposed at the distal end, the end effector including a polishing arm, a motor, and a tool head, the polishing arm including one or more second artifacts, the motor mounted on the polishing arm, the tool head extending along a lengthwise axis between and to an inner end and a tip end, the inner end disposed on the polishing arm at the motor, the tool head including a belt tensioner, a roller, and one or more first artifacts, the belt tensioner configured to bias the tip end outward from the inner end along the lengthwise axis, the roller rotatable about a tool center point of the tool head at the tip end, the tool head configured to retain an abrasive belt extending between the motor and the roller; and a calibration system including a laser device and an imaging device, the laser device configured to project a first laser image on the tool head and to project a second laser image on the polishing arm, and the imaging device configured to capture 2D image data of the one or more first artifacts, the one or more second artifacts, the first laser image, and the second laser image.

17. The polishing system of claim 16, wherein the belt tensioner includes a tool guide, a tool extension, and a biasing member, the tool guide disposed at the inner end, the tool extension disposed at the tip end, and the biasing member configured to bias the tool extension outward from the tool guide along the lengthwise axis.

18. The polishing system of claim 17, wherein the tool extension includes a first lateral side, a second lateral side, and a flat portion, the flat portion disposed on the second lateral side, the one or more first artifacts disposed on the flat portion.

* * * * *